Nov. 12, 1968     T. E. WALL     3,410,517
HOSE WATER REGULATOR
Filed March 15, 1966
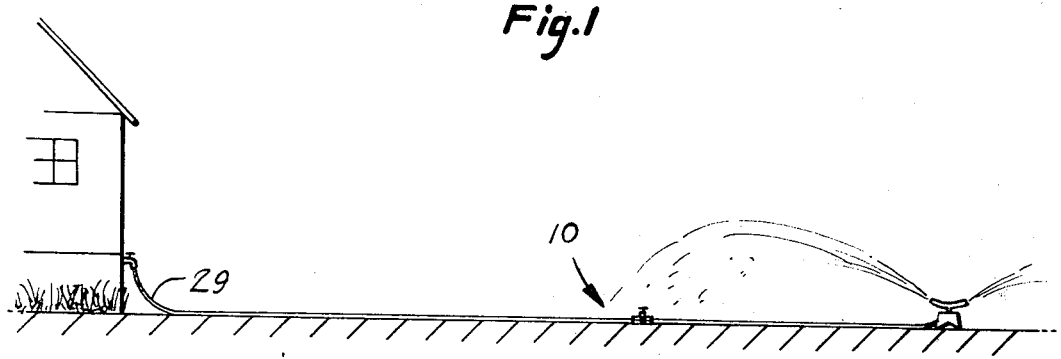
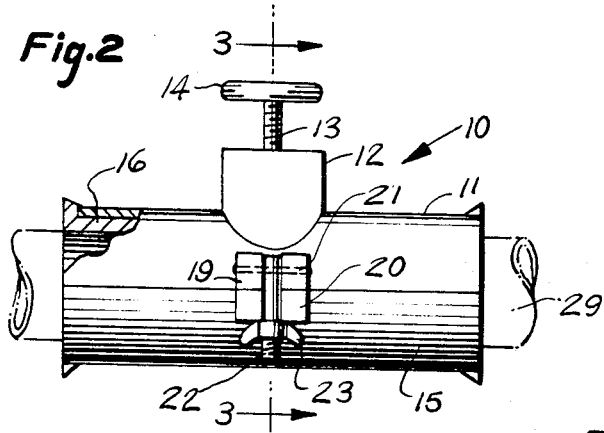
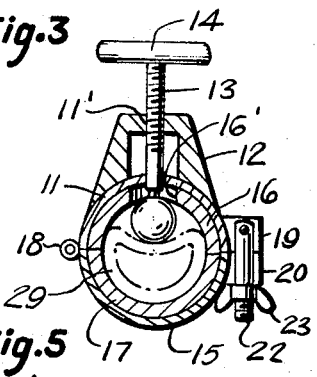
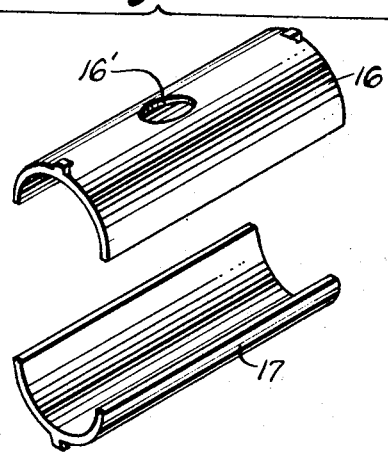
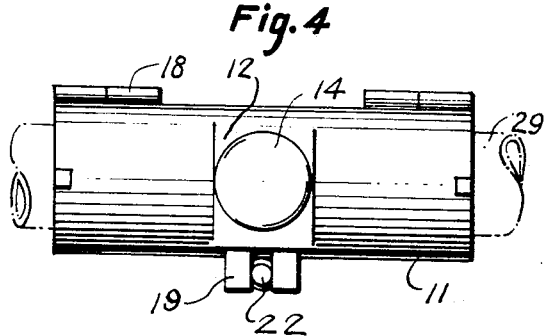
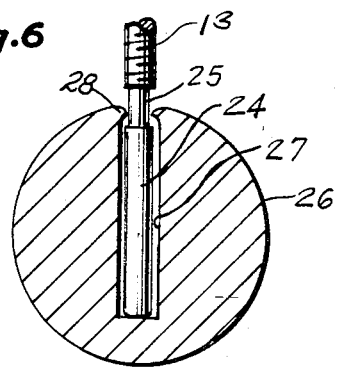
INVENTOR.
*Thomas E. Wall*

United States Patent Office 3,410,517
Patented Nov. 12, 1968

3,410,517
HOSE WATER REGULATOR
Thomas E. Wall, 55 Castle Drive,
Stratford, Conn. 06497
Filed Mar. 15, 1966, Ser. No. 534,386
5 Claims. (Cl. 251—6)

ABSTRACT OF THE DISCLOSURE

A device for regulating fluid flow through a flexible hose including a split housing which may be locked together having hose conforming inserts positionable within each portion of the split housing to firmly secure the housing on the hose. A threaded stem, having a handle at one end and carrying a rotatable pressure applying member at its other end, is threadedly mounted in one portion of the housing for movement against the hose.

---

This invention relates to regulators and valves for controlling the flow of liquids, and more particularly a hose water regulator.

It is therefore the main purpose of this invention to provide a hose water regulator that is installed or removed on a compressible tube, such as, a garden hose and adapted to provide simple and efficient means for controlling the flow of liquid to sprinklers or nozzles of a hose, said regulator being designed in such a manner that it requires no plumbing and does not become an integral part of any hose or tubing on which it is used.

Another object of this invention is to provide a foolproof regulator adapted to operably cooperate with any diameter of compressible hose or tubing, said regulator is also capable of restricting flow of liquid in such a manner that there is no need of shutting off the main supply valve when a nozzle or a sprinkler is changed on the hose.

Another object of this invention is to provide a hose water regulator which is also capable of controlling the rate of flow of gasses through a compressible tube.

Still another object of this invention is to provide a hose water regulator which is of rugged construction, inexpensive to manufacture and provided maximum utility to its user.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a side view of this invention shown in operative use.

FIGURE 2 is an enlarged side elevational view of this invention, shown partly broken away with a section of the hose shown in phantom lines.

FIGURE 3 is a transverse section taken along the lines 3—3 of FIGURE 2.

FIGURE 4 is a top plan view of FIGURE 2.

FIGURE 5 is an exploded perspective view of the hose conforming inserts shown removed from the invention.

FIGURE 6 is a cross-sectional view of the ball and stem arrangement shown in FIGURE 3.

According to this invention, a hose water regulator 10 includes a top shell unit 11 which assumes a elongated, semi-circular configuration and is capable of supporting a stem housing 12 which is suitably secured to the center portion of the shell unit 11. The top portion of stem housing 12 is provided with a tapped hole 11' adapted to threadingly admit a threaded stem 13 having a circular handle 14 firmly affixed to the top portion thereof. Bottom shell unit 15 which is of substantially identical configuration as unit 11 is, when in operative use, adapted to admit a suitable insert 17. An elongated, semi-circular insert 16 is also positioned within shell uint 11 and is capable of securing a hose or flexible tubing therein. The insert 16 includes a large opening 16' to allow it to be passed over the spherical member 26 when assembling the device. It should be noted that the abutting inserts 16 and 17 may assume a variety of inner diameters for accommodating the various hoses and flexible tubes within the top and bottom shell units 11 and 15. At least one hinge 18 is adapted to secure shell units 11 and 15 to each other. A pair of cooperating lugs 19 and 20 which outwardly extend from units 11 and 15 are adapted to house the locking mechanism of the water regulator 10. That is, lug 19 is provided with a transversely positioned pin 21 which is capable of carrying a threaded locking rod 22 and securing it by means of a wing-nut 23 to the other cooperating lug 20 of the bottom shell unit 15. The threaded stem 13 terminates in an unthreaded shank portion 24 separated therefrom by a necked portion 25. A spherical pressure member 26 defines a bore 27 to receive the shank portion 24 and has a turned lip 28 which enters the necked portion 25 to retain the spherical pressure member for rotation upon the end of the stem 13.

It will also be noted that hose 29 is firmly engaged by inserts 16 and 17 of top and bottom shell units 11 and 15 (FIGURE 3) which closely conform to the surface of hose 29. Therefore, in order to regulate the liquid flow through hose 29, handle 14 is turned, causing downward movement of the threaded stem 13 which moves the spherical pressure member 26 downwardly against the walls of hose 29 until their inner parts fully abut each other. As it can be seen from this explanation, spherical pressure member 26 in cooperation with the threaded stem 13 and its handle 14 exercises the controlling influence regarding the flow of liquid through hose or flexible tubing 29.

What I now claim is:

1. A hose water regulator comprising: a first shell defining an opening therein; a support housing carried by said first shell; a second shell; means pivotally connecting said first and second shells together; locking means releasably securing said first and second shells together; elongated inserts located within each of said shells for firmly securing the regulator upon the hose when said lockign means holds said shells together, each of said inserts having a concave substantially semi-circular inner surface complementary with the outer diameter of the hose and an outer surface complementary with the inner surface of its mating shell; and pressure applying means including a threaded stem having a handle at one end and carrying a rotatable substantially spherical pressure member at its other end, said threaded stem being supportesd in said support housing and passing through the opening in said first shell with said handle being located on the outside of said support housing and said spherical pressure member being located at the interior of the regulator when said shells are locked together, whereby rotation of said handle in one direction drives said spherical pressure member against the hose to compress the hose for regulating fluid flow therethrough.

2. The regulator according to claim 1 wherein said first and second shells are each of an elongated, semi-circular configuration and, when in closed position, their side portions are adapted to abut each other in such a manner that it causes the portions of said locking means to fully cooperate with each other.

3. The regulator according to claim 1, wherein said support housing includes a shallow housing having a tapped hole therein for supporting said threaded stem.

4. The regulator according to claim 1, wherein said locking means includes a top lug secured to one side of said first shell, said lug being provided with a hole, a locking pin within said hole, a threaded locking rod pivotally supported on said pin, a bottom lug secured to one side portion of said second shell and being adapted to communicate with said top lug thereby, in cooperation, providing means for locking said first shell to said second shell.

5. The regulator according to claim 4, wherein said rod is provided with a wing-nut for releasably securing said rod to the bottom lug of said second shell.

References Cited

UNITED STATES PATENTS

| | | | |
|---|---|---|---|
| 653,629 | 7/1900 | Schneider | 251—6 |
| 1,726,176 | 8/1929 | Burke | 251—8 |
| 2,825,524 | 3/1958 | Fox | 251—8 |
| 3,285,563 | 11/1966 | Clarkson | 251—8 |

FOREIGN PATENTS

| | | |
|---|---|---|
| 1,133,076 | 11/1956 | France. |
| 1,249,996 | 11/1960 | France. |

WILLIAM F. O'DEA, *Primary Examiner.*

RICHARD GERARD, *Assistant Examiner.*